United States Patent [19]
Pavelka

[11] Patent Number: 6,125,579
[45] Date of Patent: Oct. 3, 2000

[54] DRAINAGE DISK AND RESERVOIR SYSTEM FOR A PLANTER

[75] Inventor: Steven W. Pavelka, Akron, Ohio

[73] Assignee: Landmark Plastic Corporation, Akron, Ohio

[21] Appl. No.: 09/193,561

[22] Filed: Nov. 17, 1998

[51] Int. Cl.[7] .................................................. A01G 25/00
[52] U.S. Cl. ............................................................. 47/79
[58] Field of Search ........................... 47/65.5, 66, 79, 47/71; D11/143

[56] References Cited

U.S. PATENT DOCUMENTS

| | | | |
|---|---|---|---|
| D. 352,479 | 11/1994 | Carlson | D11/153 |
| D. 352,480 | 11/1994 | Carlson | D11/153 |
| 357,698 | 2/1887 | Burrough . | |
| 1,447,801 | 3/1923 | Maloney . | |
| 1,600,055 | 9/1926 | Meyer . | |
| 2,206,694 | 7/1940 | Greene . | |
| 2,781,651 | 2/1957 | Cutler . | |
| 3,343,774 | 9/1967 | Pryor . | |
| 3,583,664 | 6/1971 | Kalina . | |
| 4,446,652 | 5/1984 | Anderson | 47/66 |
| 4,571,883 | 2/1986 | Shaw | 47/66 |
| 5,042,197 | 8/1991 | Pope | 47/79 |
| 5,315,783 | 5/1994 | Peng | 47/66 |
| 5,321,909 | 6/1994 | Loran . | |
| 5,341,596 | 8/1994 | Kao | 47/79 |

FOREIGN PATENT DOCUMENTS

| | | | |
|---|---|---|---|
| 570755 | 12/1975 | Switzerland | 47/65.6 |
| 19337 | 7/1899 | United Kingdom | 248/346.11 |

OTHER PUBLICATIONS

Landmark Plastic Corporation, Maxi Mizer Hanging Basket Advertisement, as early as Feb. 1997.

Primary Examiner—Peter M. Poon
Assistant Examiner—Francis T. Palo
Attorney, Agent, or Firm—Oldham & Oldham Co., LPA

[57] ABSTRACT

A disk shaped insert for use in conjunction with an elevated bottom drain in a plant container. The disk rests on the drain to create a water reservoir below the disk. Excessive water is permitted to escape the container through the drain. The soil is held above the reservoir by the disk.

13 Claims, 4 Drawing Sheets

DRAINAGE DISK AND RESERVOIR SYSTEM FOR A PLANTER

BACKGROUND OF THE INVENTION

1. Field of the Invention

The present invention relates generally to planters and the proper drainage and watering of living plants kept within such planters, and more particularly to a drainage and support insert for planters which improves the drainage of water from the soil of potted plants while maintaining a reservoir for water below the surface of the insert.

2. Description of the Prior Art

Living plants, flowers and trees are often kept in containers around the house or office both for decorative and functional reasons. Many types of planters are known which provide various advantages with respect to the maintenance and/or appearance of the plant. For example, because the moisture content of the soil in a planter varies more dramatically than the moisture content of natural soil, planters have been developed to sustain a certain moisture content of the soil over a period of time to prevent the soil from drying out and damaging the plant. Likewise, planters have been designed to avoid flooding the soil and root system of plants with water, typically through drainage of excess water through the bottom of the planter. The need to balance the moisture level of plants growing in planters is therefore of critical importance in the design of any home or office planter.

Planters have been designed for reasons unrelated to moisture content of the soil. For example, flowerpot trays have been designed to protect substrata, such as carpet or other flooring materials, from damage caused by the weight and moisture placed on the substrata. Trays and saucers have also been designed to fit inside a planter. Typically, these are inserted into a planter prior to charging the planter with soil and serve to keep the soil from blocking the drainage openings in the bottom of the planter. Water must be able to drain through the insert and eventually out of the bottom of the planter. Preferably, air will also be permitted to circulate under the insert to promote evaporation of excess water and air root pruning.

One approach to balancing the moisture content of the soil within a planter is to create a reservoir of water in the bottom of the planter so that water can be transmitted to the soil and roots as needed. Planters and plant containers are known which store a supply of water near the base for use as a reservoir. This is typically accomplished either by a removable drain plug or by forming the drain as an inward protrusion from the base of the planter so as to allow for a certain volume of water to occupy the space below the drain. In the later case, water is removed from the planter only when the water level rises above the elevated drain height. Commonly, gravel is introduced into such a planter to avoid blocking the drain passageway with soil. However, in order to avoid overwatering the plant, it is necessary to keep the reservoir of water in the bottom of the planter from saturating the lower roots and surrounding soil. Accordingly, a supporting insert, such as a tray or saucer, is commonly placed into the planter and maintained above the reservoir to separate the soil and the root system from the reservoir.

Current insert designs have inadequately addressed the problem of maintaining an optimal moisture level within the soil. Previous designs either do not permit water to pass upward through the insert, resulting in an undesirably low moisture level of the soil, or more commonly, merely operate as a sieve allowing all of the water to drain from the soil. Because the proper moisture level of the soil is critical to the growth and maintenance of plant life, there is a need for a planter insert capable of draining water from the soil without drying the soil excessively. For those planters capable of storing a reservoir of water below the level of the soil, it is also desirable to have an insert which permits the water in the reservoir to moisten the soil.

SUMMARY OF THE INVENTION

The drainage disk and reservoir system of the present invention comprises a plant container having an open top and a bottom surface; a drain having side walls and a top surface and extending upward from the bottom surface and into the interior of the container; and an insert engageable with the drain, the insert having an upper surface, a lower surface, a central portion and a perimeter; wherein when the insert engages the drain a space is created between the lower surface of the insert and the lower surface of the plant container, the space defining a reservoir for the storage of water for the moisturizing of the plant inside the plant container.

Accordingly, it is an object of the present invention to provide a drainage insert for a planter capable of permitting the flow of water across the plane of the insert.

A further object of the present invention is to promote drainage of excess moisture from the soil inside a planter.

A further object of the present invention is to provide a plant container insert capable of transmitting water from a reservoir below the insert to the soil and root system above the insert.

A further object of the present invention is to provide a plant container insert which substantially separates the soil and plant from the water reservoir without sealing off the overflow drain.

A further object of the present invention is to provide a plant container insert capable of use whichever side faces upward. There is no requirement for orientation in the container because the system performs this automatically as the insert is placed in the container.

The above and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
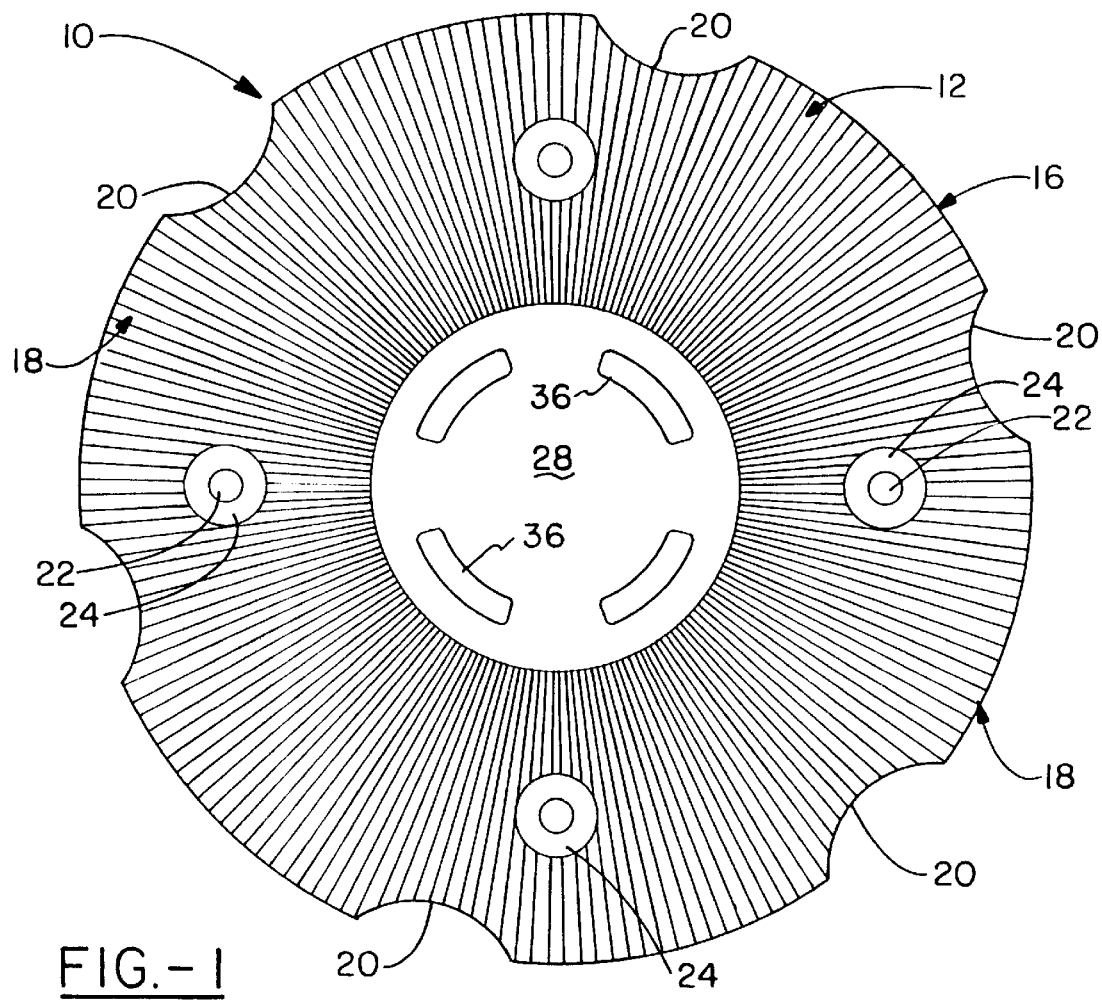
FIG. 1 is a top view of a drainage disk and reservoir insert in accordance with the present invention.

The plant container insert of the present invention is shown at 10 in FIG. 1 as a generally planar and preferably disc-shaped substrate having an upper surface 12 and a lower surface 14 and characterized by the circumference of its perimeter 16. Removable insert 10 may be made out of any suitable material, although in its preferred embodiment is made of lightweight plastic and even more preferably made of thermo-formed plastic. Insert 10 is designed to fit into a plant container or flower pot. While in its preferred embodiment insert 10 is designed to fit into a round-bottomed plant container, it is to be understood that an insert could be designed to fit into plant containers having various bottom shape configurations. An example of a round-bottomed plant container suitable for use with the insert of the present invention is shown in cross section at 30 in FIG. 2. As explained more fully below, insert 10 is designed to engage either a drain protruding inwardly from the base of a plant container and/or a ridge formed in the interior wall of a plant container.

One of the primary functions of insert 10 is the draining of water from the soil resting above insert 10. Accordingly it is contemplated that water percolating through the soil will contact insert 10 and flow toward perimeter 16. A preferred embodiment of insert 10 includes a plurality of corrugated ribs 18 extending radially along the body of the insert. The depth of channels formed by ribs 18 increases with distance from the center to the perimeter 16 of insert 10. Water contacting the upper surface 12 of insert 10 will flow outwardly along the channels in ribs 18 toward perimeter 16 in the preferred embodiment. Perimeter 16 preferably includes a plurality of scalloped or cut-away perforations 20 which allow water flowing from the center of insert 10 to pass from upper surface 12 to the bottom of the plant container without interference from the walls of the plant container, although it is recognized that water will also pass through the gap formed between the inner wall of the container and the outer perimeter of insert 10.

Figure 2:
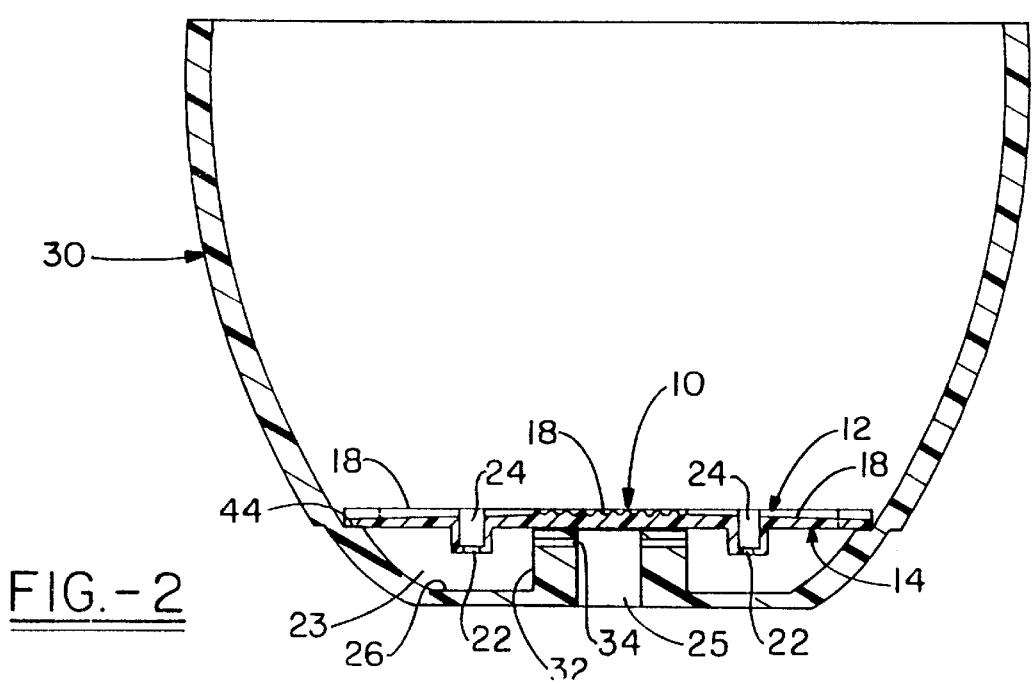
FIG. 2 is a cross sectional view of a planter having an elevated drain covered by a drainage disk and reservoir insert of the present invention.
Figure 3A:
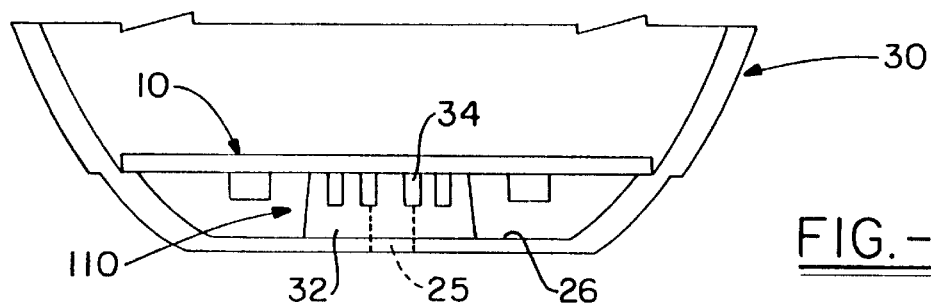
FIGS. 3a–3e are partial elevational views of various embodiments of elevated planter drains having at least one hole or channel in accordance with the present invention.
Figure 3B:
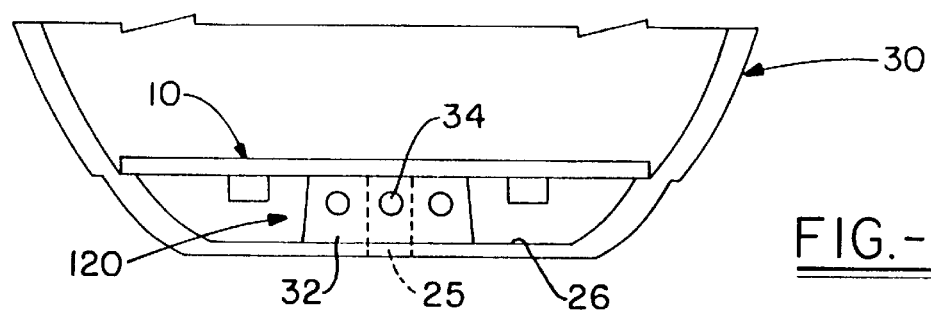
Figure 3C:
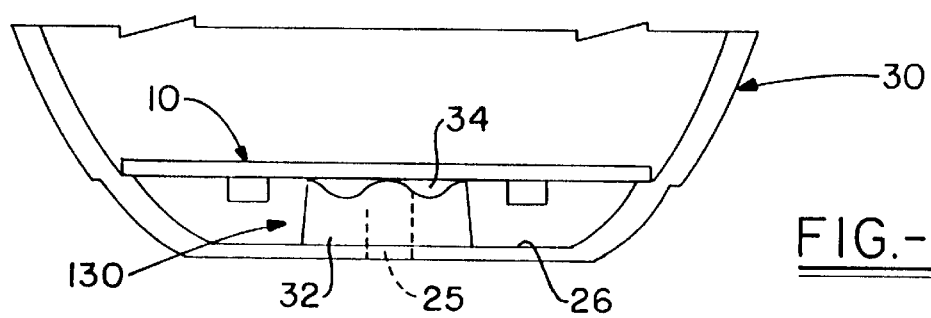
Figure 3D:
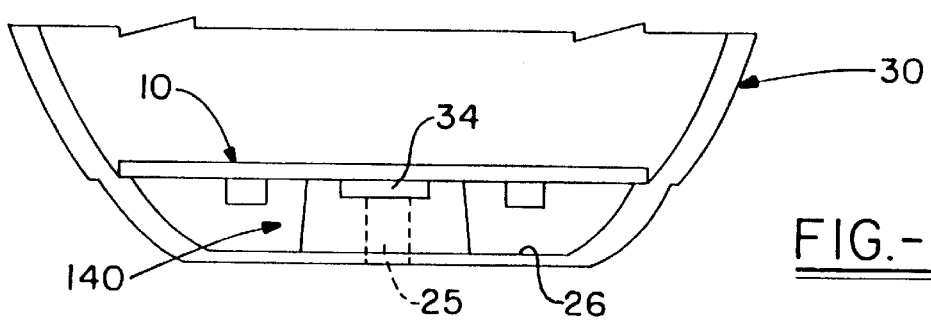
Figure 3E:
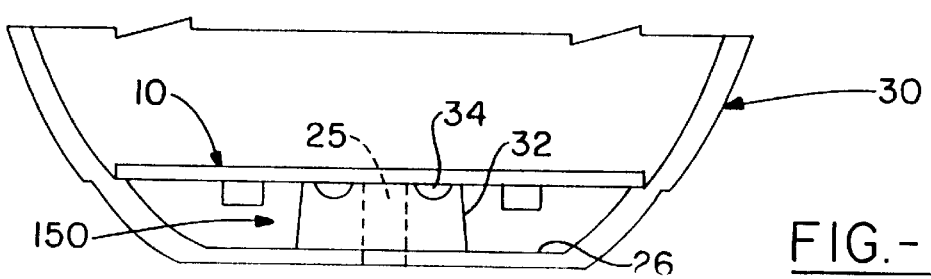

In addition to perforations 20, the insert of the present invention optionally includes a plurality of apertures 22 cut from the body of the insert. As shown in FIG. 2, the apertures 22 are preferably made through optional counter-sinks 24 which extend below the main surface of insert 10. It is contemplated that excess water in the soil will pass from insert 10 through apertures 22 in addition to flowing toward perimeter 16. A reservoir of water 23 is thereby formed in the space between insert 10 and the bottom surface 26 of plant container 30. Soil and/or plant roots may extend into counter sinks 24 and to a limited degree through apertures 22 into reservoir 23. Moisture can be directly transmitted to the plant from reservoir 23 via the root system, or via the wicking action through aperture 24 and upward through the soil in counter sink 24 to the main body of the soil.

Figure 5:
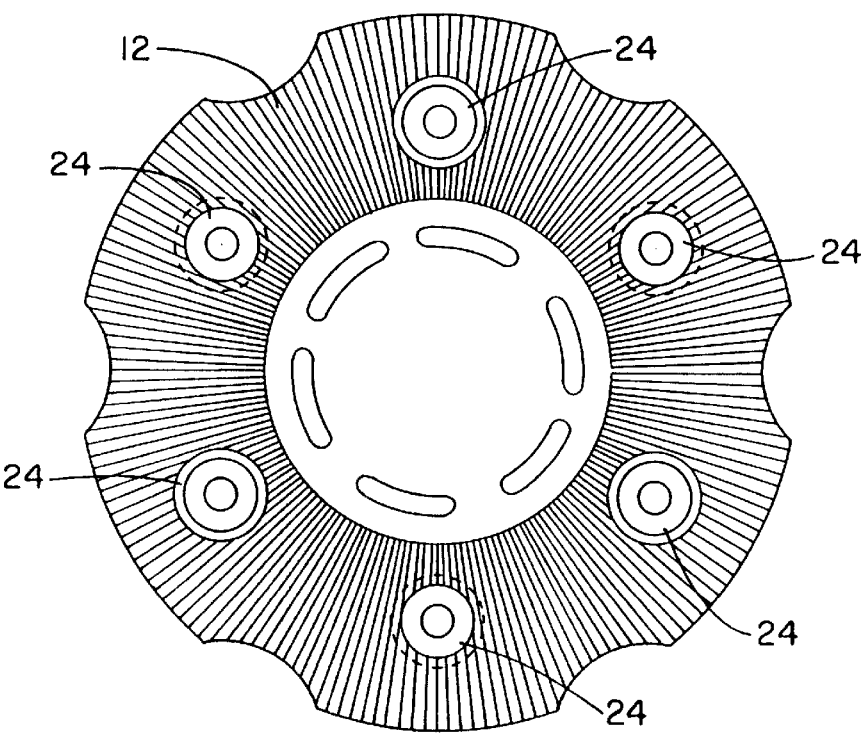
FIG. 5 is a top view of an embodiment of a removable insert of the present invention having countersinks extending from both the upper and lower surfaces of the insert.
Figure 5A:
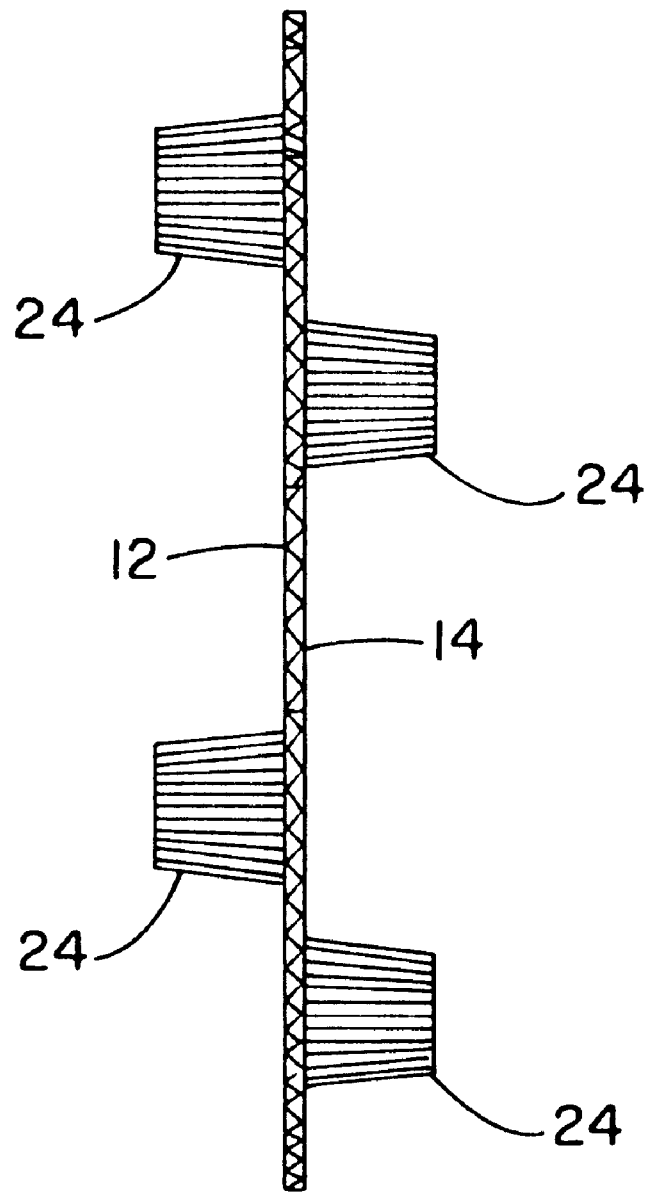
FIG. 5a is a cross sectional view of the embodiment shown in FIG. 5.

Insert 10 as shown in FIGS. 1 and 2 is intended to be inserted into a plant container with surface 14 facing downward and toward container bottom 26. However, it is contemplated that insert 10 can be formed with ribs on both surfaces 12 and 14 and further that a plurality of counter sinks 24 could extend from each side 12 and 14 of insert 10 as shown in FIGS. 5 and 5a. In this way the insert could be placed into a container without regard as to which surface is facing upward.

Figure 4:
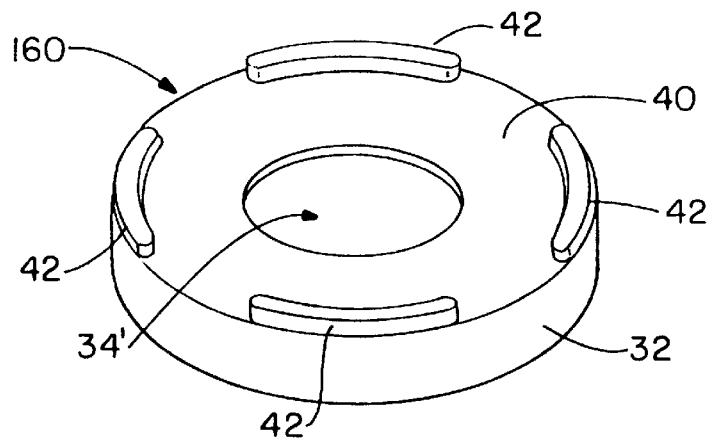
FIGS. 4 and 4a are perspective views of two embodiments of elevated drains in accordance with the present invention.
Figure 4A:
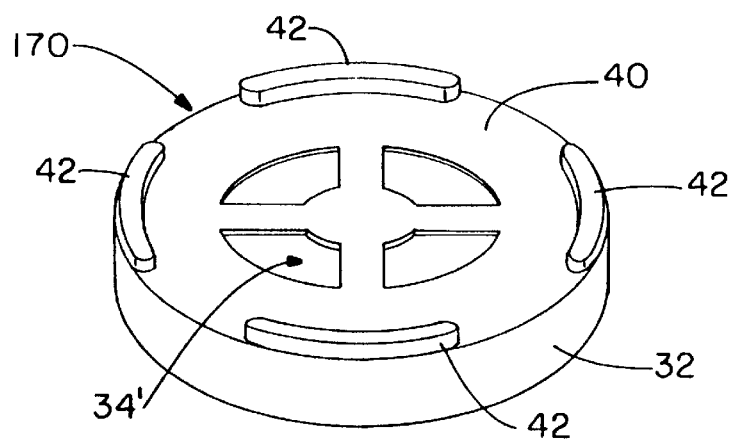

FIGS. 3a–3e depict elevational views of several elevated drain designs (110–150) in accordance with the present invention. Generally, these elevated drains are characterized as cylindrical bodies extending inward from the bottom surface 26 of plant container 30. To facilitate the removal of excess water and to prevent insert 10 from forming a seal over the elevated drain, the substantially vertical side wall 32 of the drain is formed so as to include at lease one hole or channel 34 which allows water to drain from the container when insert 10 is in place. Excess water from reservoir 23 is able to pass through at least one hole or channel 34 to drain 25 thereby exiting container 30. Although the drains depicted in FIGS. 3a–3e have at least one hole or channel 34 in side wall 32, alternative embodiments include at least one hole or channel 34' in the top surface 40 of the drain (160–170) as shown in FIG. 4. Elevated drains of the type depicted in FIGS. 3 and 4 may be further modified to avoid the sealing effect of insert 10 by incorporating a plurality of ridges 42 on at least part of top surface 40 as shown in FIG. 4. In this way, a space is formed between the drain and insert 10. Ridges 42 may be disposed on top surfaces 40 in any manner, although in a preferred embodiment ridges 42 are disposed symmetrically over at least part of top surface 40.

Insert 10 is designed to function cooperatively with a protruding drain of the present invention or those of conventional design. The insert shown in FIG. 1 does not include radially extending corrugated ribs 18 in central portion 28, although the present invention would not preclude a central portion having them. Central portion 28 optionally includes a plurality of raised protuberances 36 extending from either bottom surface 14 or alternatively from both bottom surface 14 and upper surface 12. Protuberances 36 are designed to prevent the sealing of a drain opening when insert 10 rests on the upper surface of a drain. Accordingly, protuberances may be of any shape provided that they are incapable of sealing a drain. In the embodiment shown in FIG. 1, protuberances 36 are in the form of a ring broken into four raised sections so that when the insert is placed over a drain opening as shown in FIG. 2, water may flow between the broken sections and exit the drain. Preferably, insert 10 is positioned within the container so that central portion 28 is slightly raised relative to the perimeter to facilitate the radial flow of water toward the perimeter. This height differential is accomplished by forming a drain with a top surface 40 which is positioned higher than shelf 44 which supports perimeter 16 of insert 10. Alternatively, this is accomplished using ridges 42 on the drains top surface or protuberances 36 formed on the insert 10.

As an alternative or as a compliment to engaging an elevated drain as shown in FIGS. 2 and 3, insert 10 may also engage a supporting surface 44 built into the walls of container 30. Supporting surface 44 provides additional support to insert 10 at perimeter 16.

Although the preferred embodiments of the invention have been described in the foregoing DESCRIPTION OF THE PREFERRED EMBODIMENT and illustrated in the accompanying drawings, it will be understood that the invention is not limited to the embodiments disclosed, but is capable of modification of parts and elements without departing from the spirit and/or scope of the invention.

What is claimed is:

1. A drainage disk and reservoir system for a plant container, comprising:

a plant container having an open top, an upwardly extending wall provided with an inwardly projecting, drainage disk supporting surface and a bottom; an open drain having a side wall and a top surface, said drain extending upward from the center of said bottom of said plant container to a height above said drainage disk supporting surface and thereby creating a height differential between said top surface of said drain and said drainage disk supporting surface; and a removable insert comprising an upper surface, a lower surface, a central portion and a perimeter;

wherein, said central portion of said insert contacts said drain top surface and said perimeter of said insert contacts said inwardly projecting drainage disk supporting surface thereby resulting in said upper surface and said lower surface of said insert sloping downwardly to said drainage disk supporting surface and creating a space between said lower surface of said insert and an inner surface of said bottom of said plant container.

2. A drainage disk and reservoir system for a plant container as recited in claim 1, wherein said insert further comprises a plurality of perforations located on said perimeter and a plurality of corrugated ribs extending from said central portion to said perimeter and said plurality of perforations so that a quantity of excess water received through said open top of said container and flowing downwardly to said upper surface of said insert will be directed by said ribs to said perimeter and said plurality of perforations.

3. A drainage disk and reservoir system for a plant container as recited in claim 1, wherein said insert further comprises a plurality of raised, arcuately shaped protuberances extending from said central portion in the form of a broken ring.

4. A drainage disk and reservoir system for a plant container as recited in claim 3, wherein said broken ring of said arcuately shaped protuberances contact said top surface of said drain.

5. A drainage disk and reservoir system for a plant container as recited in claim 1, wherein said drain includes a passage and a hole in said top surface of said drain, said passage having a first open end and a second open end, said first open end communicating with said space between said lower surface of said insert and said inner surface of said bottom of said plant container, and said second open end communicating with said hole.

6. A drainage disk and reservoir system for a plant container as recited in claim 1, further comprising a plurality of arcuately shaped ridges on said top surface of said drain.

7. A drainage disk and reservoir system for a plant container as recited in claim 6, wherein said plurality of arcuately shaped ridges are symmetrically arranged in the form of a broken ring on said top surface of said drain.

8. A removable insert for a plant container, comprising:

an upper surface, a lower surface, a central portion and a perimeter;

wherein said upper surface includes a plurality of corrugated ribs extending radially from said central portion to said perimeter, said corrugated ribs have a depth which increases with distance from said central portion toward said perimeter so that a quantity of excess water received through said open top of said container and flowing downwardly to said upper surface of said insert will be directed by said ribs to said perimeter.

9. A removable insert for a plant container as recited in claim 8, wherein said lower surface includes a plurality of corrugated ribs extending radially from said central portion to said perimeter, said corrugated ribs have a depth which increases with distance from said central portion to said perimeter.

10. A removable insert for a plant container as recited in claim 8, further comprising:

at least one countersink extending from said lower surface and having an aperture provided in a horizontal end portion of said at least one countersink, said aperture permitting a flow of moisture between said upper surface and said lower surface of said insert.

11. A removable insert for a plant container as recited in claim 8, further comprising:

at least one countersink extending from said upper surface and having an aperture provided in a horizontal end portion of said at least one countersink, said aperture permitting a flow of moisture between said upper surface and said lower surface of said insert.

12. A removable insert for a plant container as recited in claim 9, wherein when said lower surface of said insert is oriented upwardly in said plant container, a quantity of excess water received through said open top of said container and flowing downwardly to said upwardly oriented lower surface of said insert will be directed by said ribs to said perimeter.

13. A drainage disk and reservoir system for a plant container as recited in claim 12, wherein said insert further includes a countersink having a top edge defining an open countersink top and further having a countersink bottom with an aperture provided therethrough, said countersink extending downwardly from said upper surface and said bottom surface of said insert and being positioned radially outward from said central portion of said insert so that an arcuate section of said plurality of corrugated ribs intersects said top edge of said countersink top and thereby permits a portion of said quantity of excess water to flow downwardly through said countersink, through said aperture in said countersink bottom and into said space between said lower surface of said insert and said inner surface of said bottom of said plant container.

* * * * *

UNITED STATES PATENT AND TRADEMARK OFFICE
CERTIFICATE OF CORRECTION

PATENT NO. : 6,125,579
DATED : October 3, 2000
INVENTOR(S) :
      Steven W. Pavelka It is certified that error appears in the above-identified patent and that said Letters Patent is hereby corrected as shown below:

Col. 6, line 34
  replace "container as recited in claim 12, . . ."
  with --container as recited in claim 3, . . .--.

Signed and Sealed this

Eighth Day of May, 2001

Attest:

NICHOLAS P. GODICI

*Attesting Officer*      Acting Director of the United States Patent and Trademark Office